Patented May 4, 1948

2,440,997

UNITED STATES PATENT OFFICE 2,440,997

PROCESS FOR PRODUCING TRANS-1,2-DICHLORETHYLENE

Erich Adler, Stockholm, Sweden, assignor to Stockholms Superfosfat Fabriks Aktiebolag, Stockholm, Sweden, a corporation of Sweden No Drawing. Application September 22, 1944, Serial No. 555,396. In Sweden June 29, 1943

9 Claims. (Cl. 260—654)

It is known to form dichlorethylene (CHCl=CHCl)

by conducting acetylene through hydrochloric acid containing a mixture of chloride of copper and cuprous chloride with ammonium chloride (Nieuwland and Foohey, Proc. Indiana Acad. Sci., 38,196; 1929). By this process a mixture of unsymmetrical and cis-trans dichlorethylenes is formed. Without cuprous chloride no reaction takes place.

It has now been ascertained that a reaction between acetylene and chloride of copper in hydrochloric solution takes place by adding mercuric chloride to the solution. The reaction runs according to the following scheme:

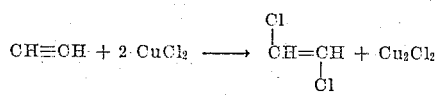

Mercuric chloride functions as catalyser in this reaction, it initiates the reaction itself and the cuprous chloride formed also exercises a catalytic action, the rapidity of reaction is therefore auto-catalytically increased. The rapidity decreases first if the cuprous chloride is almost completely consumed.

Example 1

Pure acetylene gas is introduced into 450 ml. of a 2 molar solution of $CuCl_2$ in HCl of 25 per cent heated to 90° C. The acetylene gas passed unchanged. After the addition of 0.1 mol/l. cuprous chloride ($Cu_2Cl_2$) dichlorethylene is formed gradually and is recovered from the outstreaming gas by cooling. After 180 minutes the whole quantity of $CuCl_2$ was reduced to $Cu_2Cl_2$, and the formation of dichlorethylene then ceased. The yield of dichlorethylene was 31.5 g. or 73% calculated on the quantity of the used $CuCl_2$. In a second experiment 0.1 mol/l. $HgCl_2$ was added to the above mentioned $CuCl_2$-HCl-solution. The formation of dichlorethylene began immediately and was finished after 130 minutes when the whole amount of the chloride of copper was reduced. The yield of dichlorethylene was 36.5 g. or 84.5% calculated on the quantity of the $CuCl_2$ used.

The process catalysed by mercury chloride differs thus by its larger velocity from the process catalysed by cuprous chloride. There is also a qualitative difference between the mode of operation of the two catalysts. It has been ascertained that the dichlorethylene formed with $HgCl_2$ as catalyser consists exclusively of the trans-isomer (boiling point 48°) while with $Cu_2Cl_2$ according to Nieuwland and Foohey a mixture of unsymmetrical and cis-trans dichlorethylenes is obtained.

With the process performed with $HgCl_2$ according to the invention a very good yield of dichlorethylene is obtained, calculated on the introduced acetylene gas as appears from the following example.

Example 2

Acetylene gas was introduced into a solution of $CuCl_2$ (2 mol/l.) and $HgCl_2$ (0.4 mol/l.) in HCl of 20 per cent with a velocity of 6.5 l./h. After a reaction time of 30 minutes the escaping gas consists of 83% dichlorethylene, 8% vinylchloride and only 9% acetylene not changed.

The concentrations of the components entering into the reaction solutions may vary within rather wide limits. Variation of the HCl concentrations between 25 and 10% causes only a small reduction of the velocity of the reaction. First with HCl of 5 per cent the velocity becomes considerably lower. The rate of formation of dichlorethylene increases if the $HgCl_2$ concentrations is kept between 0.01 and 0.4 mol/l.; above the last named concentration the velocity is not greatly increased.

The concentration of HCl as well as that of $HgCl_2$ exercises an influence on the formation of vinylchloride appearing as by-product as the formation of this product is favoured by a high concentration of these two components. The quantity of the vinylchloride does not exceed 12% of the formed dichlorethylene under the conditions of the process. It is advantageous for suppressing the formation of vinylchloride to use relatively low HCl and $HgCl_2$ concentrations (see the following example).

Example 3

In an experiment where the acetylene was conducted through HCl of 15 per cent, being 1.0 molar with regard to $CuCl_2$ and 0.1 molar with regard to $HgCl_2$ there was obtained by condensation of the discharging gas at −70° a reaction product, consisting after careful fractionation as stated of 2.7% vinylchloride, 95.8% transdichlorethylene and 1.5% of a higher boiling remainder.

The reaction may preferably be conducted at 90° C. At lower temperatures the reaction velocity is lower.

The present invention markedly improves the transformation of acetylene with chloride of copper in the presence of cuprous chloride as catalyser as it is possible to perform the process continuously in a simple manner. The cuprous chloride formed during the reaction between acetylene and the chloride of copper may be easily and quantitatively reoxydized to chloride of copper. Thanks to the presence of mercuric chloride which remains unchanged during the whole process the regenerated chloride of copper may afterwards immediately be transformed again with acetylene and so on. In such an alternating process the same solution can be used in a practically unlimited number of reactions. The used chloride of copper is completely utilized in each reaction.

For obtaining a continuous production of dichlorethylene with a single plant this principle may be varied in such a manner that two reaction vessels are used and at the same time the CuCl$_2$ solution is reduced in one vessel while at the same time the cuprous chloride formed before in the other vessel is reoxydized with the aid of chlorine. After the reduction is finished in the first vessel chlorine is introduced, while acetylene is introduced into the other vessel. The production of dichlorethylene can proceed uninterrupted as the chlorination of Cu$_2$Cl$_2$ to CuCl$_2$ proceeds with greater speed than the reduction of CuCl$_2$ by acetylene.

It is possible to realize a complete continuous process by conducting a mixture of chlorine and acetylene through CuCl$_2$-HgCl$_2$-HCl solutions. Thereby it is, however, necessary for preventing the formation of the exothermic reaction between acetylene and chlorine in gas phase which often is deflagrating to use a larger excess of acetylene or to dilute the reaction gases with an inert gas for example nitrogen gas. Good results have been obtained with a mixture of 2 l. chlorine, 3.2 l. acetylene and 8 l. nitrogen by the hour.

The danger of explosion may be practically entirely removed and the process may be realized throughout continuously without diluting of the reaction gases if the reaction solution is circulating through a system with two reaction cylinders whereby acetylene is introduced into one and chlorine into the other cylinder.

The described process for producing dichlorethylene by a wet process has essential advantages over the known dry catalytic processes. For example the danger of explosion is considerably lower in the first named process than in the latter. Besides the yield in the known dry catalytic process is less than in the herein described process. Finally in the dry catalytic processes either mixtures of cis- and transdichlorethylene or mixtures of dichlorethylene with higher chlorated products, particularly tetrachlorethane, are always formed. According to this invention raw products are easily formed containing already about 95% pure trans-dichlorethylene.

I claim:

1. A process for manufacturing of trans-1,2-dichlorethylene, consisting in passing acetylene through a hydrochloric acid solution of cupric chloride in the presence of mercuric chloride.

2. A process for manufacturing of trans-1,2-dichlorethylene, consisting in passing acetylene and chlorine through a hydrochloric acid solution of cupric chloride in the presence of mercuric chloride.

3. A process for manufacturing of trans-1,2-dichlorethylene, consisting in passing acetylene and chlorine simultaneously through a hydrochloric acid solution of cupric chloride in the presence of mercuric chloride.

4. A process for manufacturing of trans-1,2-dichlorethylene, consisting in passing acetylene and chlorine alternately through a hydrochloric acid solution of cupric chloride in the presence of mercuric chloride.

5. In a process for the continuous manufacturing of trans-1,2-dichlorethylene the step of circulating a hydrochloric acid solution of cupric chloride in the presence of mercuric chloride through a system, whereby acetylene and chlorine are added continuously on separate parts of the system.

6. In a process for the continuous manufacturing of trans-1,2-dichlorethylene the step of circulating a hydrochloric acid solution of cupric chloride in the presence of mercuric chloride through a system with two reaction cylinders whereby acetylene is introduced into one and chlorine into the other cylinder.

7. In a process for the manufacturing of trans-1,2-dichlorethylene the step of conducting a mixture of chlorine and acetylene through a hydrochloric acid solution of cupric chloride in the presence of mercuric chloride and using a large excess of acetylene.

8. In a prcoess for the manufacturing of trans-1,2-dichlorethylene the step of conducting a mixture of chlorine and acetylene through a hydrochloric acid solution of cupric chloride in the presence of mercuric chloride and diluting the reaction gases with an inert gas.

9. In a process for the manufacturing of trans-1,2-dichlorethylene the step of conducting a mixture of chlorine and acetylene through a hydrochloric acid solution of cupric chloride in the presence of mercuric chloride and diluting the reaction gases with nitrogen gas.

ERICH ADLER.

REFERENCES CITED

The following references are of record in the file of this patent:

UNITED STATES PATENTS

| Number | Name | Date |
| --- | --- | --- |
| 1,541,174 | Ostromislensky | June 9, 1925 |

OTHER REFERENCES

Nieuwland et al., "Proc. Indiana Acad. Sci.," vol. 38, page 196 (1929).

Freidlina et al., "Comptes Renuds (Doklady) de l'Academie des Sciences de l' U. R. S. S.," vol. 26, pages 60–64 (1940).